United States Patent
Rutar et al.

(10) Patent No.: US 11,906,067 B2
(45) Date of Patent: Feb. 20, 2024

(54) ACTIVE VALVE SHIMMING

(71) Applicant: Hamilton Sundstrand Corporation, Charlotte, NC (US)

(72) Inventors: Matej Rutar, Manchester, CT (US); Todd Haugsjaahabink, Springfield, MA (US); Aaron F. Rickis, Long Meadow, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/581,754

(22) Filed: Jan. 21, 2022

(65) Prior Publication Data
US 2023/0235822 A1 Jul. 27, 2023

(51) Int. Cl.
| | |
|---|---|
| *F16K 31/00* | (2006.01) |
| *F16K 31/52* | (2006.01) |
| *F16K 37/00* | (2006.01) |
| *G05D 16/20* | (2006.01) |
| *F16K 3/32* | (2006.01) |
| *F01L 1/20* | (2006.01) |

(52) U.S. Cl.
CPC .............. *F16K 3/32* (2013.01); *F16K 31/00* (2013.01); *F16K 31/52* (2013.01); *F16K 37/00* (2013.01); *G05D 16/20* (2013.01); *F01L 1/205* (2013.01)

(58) Field of Classification Search
CPC ...... F16K 3/32; F16K 2200/304; F16K 17/06; F16K 31/004–008; F01L 1/205; G05D 16/202; G05D 16/20
See application file for complete search history.

(56) References Cited

U.S. PATENT DOCUMENTS

| | | | |
|---|---|---|---|
| 5,597,008 A * | 1/1997 | Overdiek ............... | G05D 16/10 73/1.72 |
| 6,105,879 A | 8/2000 | Potz et al. | |
| 6,771,005 B2 | 8/2004 | Cotton, III | |
| 10,316,713 B2 | 6/2019 | Shepherd et al. | |
| 11,079,035 B2 | 8/2021 | Brown | |
| 2005/0199746 A1 * | 9/2005 | Bartunek ............... | F02M 61/08 239/584 |

(Continued)

FOREIGN PATENT DOCUMENTS

| | | | | |
|---|---|---|---|---|
| CN | 110425305 A | * | 11/2019 | |
| CN | 111245288 A | * | 6/2020 | ........... H02N 2/0075 |

(Continued)

OTHER PUBLICATIONS

Extended European Search Report dated Jun. 16, 2023, issued during the prosecution of European Patent Application No. EP 23152767.2.

*Primary Examiner* — Marina A Tietjen
(74) *Attorney, Agent, or Firm* — Locke Lord LLP; Joshua L. Jones; Gabriella D'Angelo

(57) ABSTRACT

In accordance with at least one aspect of this disclosure, a system can include, a moveable component configured to move between one or more positions, a biasing member operatively connected on a first side to bias the moveable component to a respective one of the one or more positions, and a preload member operatively connected to provide a force to a second side of the biasing member. An actuator can be operatively connected to move the preload member in response to a signal from a controller.

18 Claims, 2 Drawing Sheets

(56) References Cited

U.S. PATENT DOCUMENTS

2008/0011371 A1     1/2008   Burkhart et al.
2010/0326543 A1    12/2010   Boehm et al.
2022/0099204 A1*   3/2022   Taylor ................ G05D 16/0636

FOREIGN PATENT DOCUMENTS

| DE | 6909636 | U |   | 9/1969 |   |   |
|----|---------|---|---|--------|---|---|
| GB | 2165372 | A | * | 4/1986 | ............ | B29C 65/00 |
| GB | 2338513 | A |   | 12/1999 |   |   |
| JP | S636282 | A | * | 1/1988 |   |   |
| KR | 2012013671 |   |   | 2/2012 |   |   |
| KR | 20180049671 | A |   | 5/2018 |   |   |
| WO | 200079164 | A1 |   | 12/2000 |   |   |
| WO | 2015173454 | A1 |   | 11/2015 |   |   |
| WO | 2016146742 | A1 |   | 9/2016 |   |   |
| WO | WO-2021089986 | A1 | * | 5/2021 | ............ | E03B 7/075 |

* cited by examiner

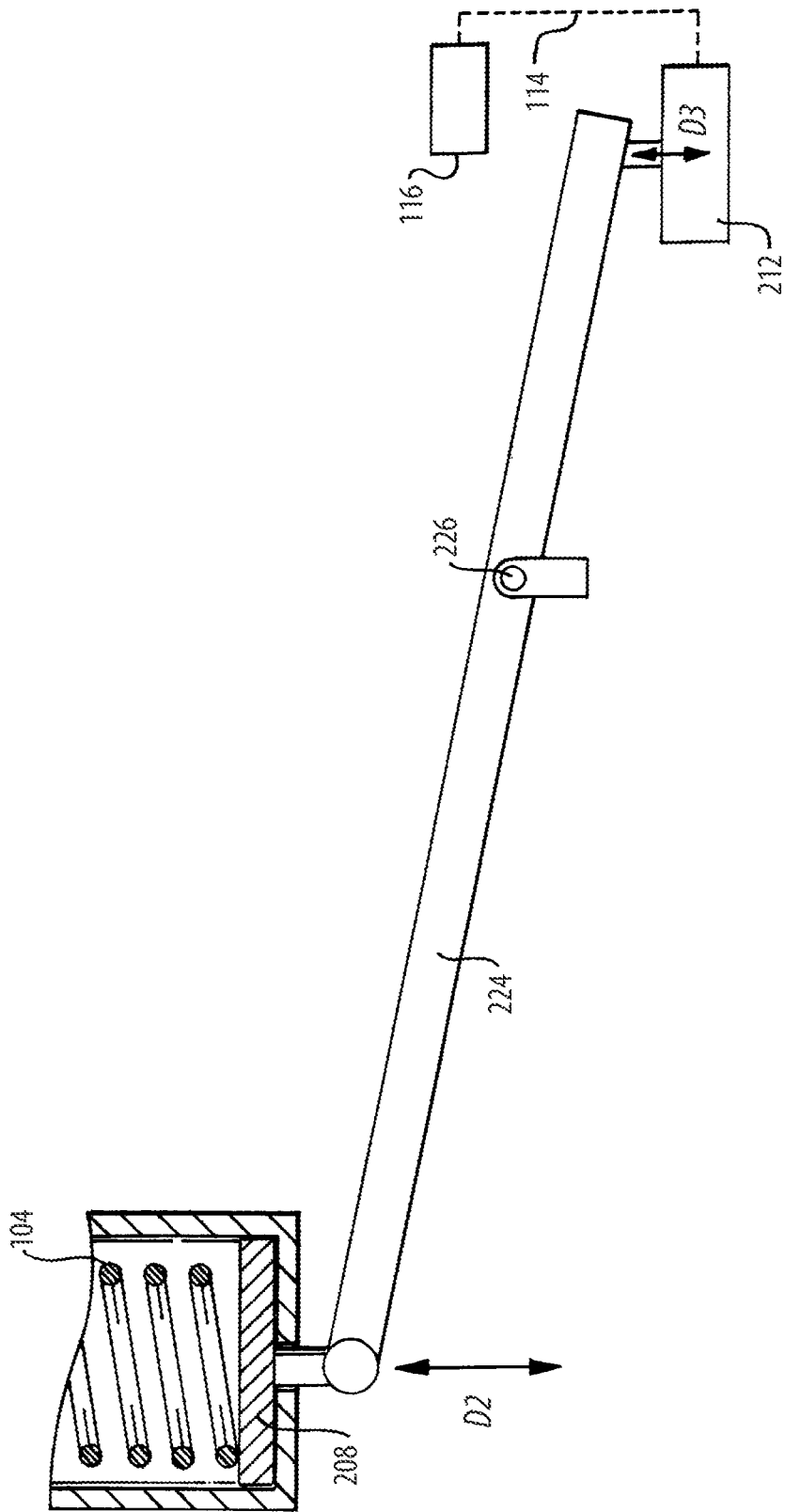

ACTIVE VALVE SHIMMING

TECHNICAL FIELD

The present disclosure relates to valves, and more particularly to valve shimming.

BACKGROUND

Typically, valve spring preload is adjusted during initial installation through shims or with a manual adjustment screw. This can be a time-consuming process, and additional factors in the valve design lead to variation in steady-state performance. Moreover, these conventional methods may make adjusting the preload during operation of a fluid system difficult or even impossible.

There is always a need in the art for improvements to valve shimming and active preload adjustment. This disclosure provides a solution for this need.

SUMMARY

In accordance with at least one aspect of this disclosure, a system includes a moveable component configured to move between one or more positions, a biasing member operatively connected on a first side to bias the moveable component to a respective one of the one or more positions, and a preload member operatively connected to provide a force to a second side of the biasing member. An actuator operatively connected to move the preload member in response to a signal from a controller to adjust the force applied to the second side of the biasing member and to adjust displacement of the moveable component. In embodiments, the controller is operatively connected to control the actuator.

In certain embodiments, the moveable component can include a valve body disposed in a valve chamber, wherein the valve body is configured to move between an open position and a closed position within the valve chamber to change a state of a valve. The biasing member can be disposed in the valve chamber and can be configured to bias the valve body towards a first position. In certain such embodiments, the actuator can be configured to adjust the force applied to the biasing member to change an operating set point of the valve.

In embodiments, a fluid source can be configured to supply fluid to the valve, where the controller can be configured to control the actuator to adjust the preload member while fluid is supplied to the valve. In certain embodiments, the actuator can include a piezoelectric actuator.

In certain embodiments, the system can include a mechanical advantage device operatively connected between the preload member and the actuator, wherein the actuator is configured to move the preload member via the mechanical advantage device in response to a signal from a controller to adjust the force applied to the biasing member and change displacement of the moveable component. In certain embodiments, the mechanical advantage device can include a lever having a lever arm. In certain such embodiments, a fulcrum of the lever arm can be positioned such that displacement of the preload member by the lever arm is larger than displacement of the lever arm by the actuator. In certain embodiments, the mechanical advantage device can include a cam shaft.

In accordance with at least one aspect of this disclosure, a method can include, actively adjusting a preload member of a valve while fluid is supplied to the valve. In embodiments, actively adjusting can include directly applying a force to the preload member. In certain embodiments, actively adjusting can include indirectly applying a force to the preload member through a mechanical advantage device.

In certain embodiments, actively adjusting can include controlling an actuator operatively connected to move the preload member to adjust a force applied to a biasing member by the preload member to change a state of the valve. In certain embodiments, actively adjusting can include adjusting the force applied to the biasing member by the preload member to change an operating set point of the valve.

In embodiments, controlling the actuator to change the operating set point of the valve can include controlling the actuator based at least in part on feedback from a sensor in a fluid line in which the valve is disposed. In embodiments, the feedback can include at least one of: total flow, pressure, temperature, and/or a position of one or more additional valves or a fluid therein. In certain embodiments, the method can include supplying fluid to the valve via a pump, such that actively adjusting includes adjusting the preload member of the valve without shutting down the pump.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 2 is a schematic diagram in accordance with this disclosure, showing another means for active valve shimming.

DETAILED DESCRIPTION

Figure 1:
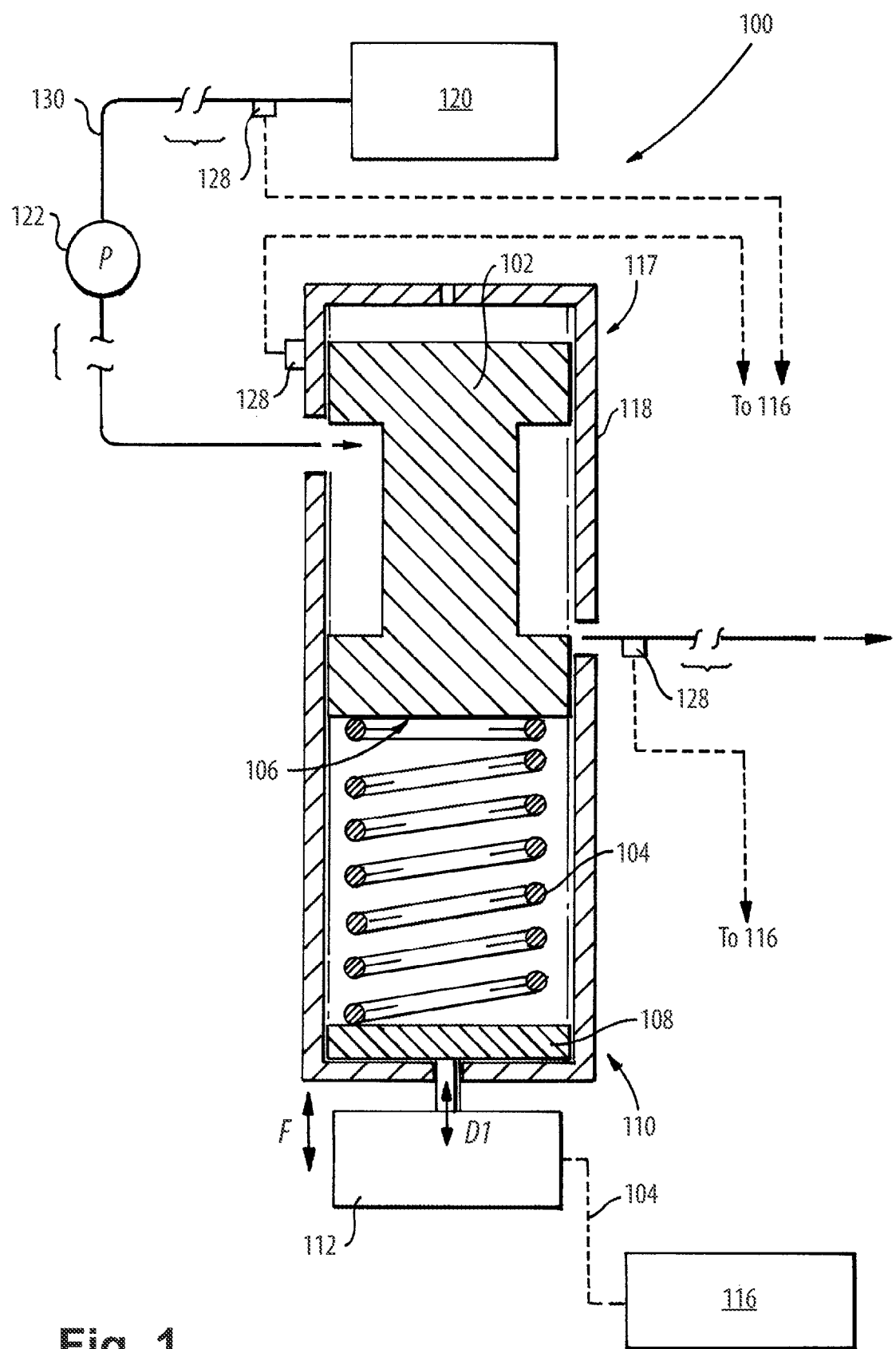
FIG. 1 is a schematic diagram in accordance with this disclosure, showing a means for active valve shimming.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2.

In accordance with at least one aspect of this disclosure, a system 100 (e.g., for actively shimming a valve), can include, a moveable component 102 configured to move between one or more positions (e.g., a first position, a second position, and an intermediate position), a biasing member 104 operatively connected to the moveable component 102 on a first side 106 to bias the moveable component 104 to a respective one of the one or more positions, and a preload member 108 operatively connected to provide a force F to a second side 110 of the biasing member 104. An actuator 112 can be operatively connected to move the preload member 104 in response to a signal 114 from a controller 116. The signal 114 from the controller 116 can be a signal configured to cause the actuator 112 to adjust the force F applied to the second side 110 of the biasing member 104 and to adjust displacement D1 of the moveable component 102. In embodiments, the controller 116 can be operatively connected to control the actuator 112, as described.

In certain embodiments, the moveable component 102 can be a valve body (e.g., the moveable component 102) of a valve 117 disposed in a valve chamber 118 where the valve body 102 is configured to move between an open position and a closed position within the valve chamber 118 (where the valve body 102 is shown in an intermediate, open position in FIG. 1). The biasing member 104 can be disposed in the valve chamber 118 to bias the valve body 102 towards a certain position, such as a first position, for example. The actuator 112, therefore can be configured to adjust the force F applied to the biasing member 104 by the preload member 108 to change an operating set point of the valve 117.

In embodiments, a fluid source 120 can supply fluid to the valve 117, and the controller 116 can be configured to control the actuator 112 to adjust the preload member 108 while fluid is supplied to the valve 117. For example, a pump 122 can be included upstream of the valve 117 to supply the fluid to the valve 117 from the fluid source 120, and the controller 116 can be configured (e.g., via machine readable instructions) to control the actuator 112 to adjust the preload member 108 without shutting down the pump 122, to allow for on the fly preload adjustment.

In certain embodiments, the actuator 112 can include a piezoelectric actuator. In certain embodiments, such as shown in FIG. 2, a lever arm 224 can be operatively connected between the preload member 208 and the actuator 212, wherein the actuator 212 is configured to move the preload member 208 via the lever arm 224 in response to the signal 114 from the controller 116 In embodiments, a fulcrum 226 of the lever arm 224 can be positioned such that the displacement D2 of the preload member 208 by the lever arm 224 is larger than the displacement D3 of the lever arm 224 by the actuator 212, utilizing the mechanical advantage of the lever arm 224. For example, the fulcrum 224 can be positioned closer to the actuator 212 than to the preload member 208.

In accordance with at least one aspect of this disclosure, a method can include, actively adjusting a preload member (e.g., preload member 108) of a valve (e.g., valve 117) while fluid is supplied to the valve. In embodiments, the method can include supplying fluid to the valve via a pump (e.g., pump 122) and actively adjusting can include adjusting the preload member of the valve without shutting down the pump.

In embodiments, actively adjusting can include directly applying a force to the preload member, for example with one or more actuators (e.g., actuator 112) connected directly to the preload member, as shown in FIG. 1. In certain embodiments, actively adjusting can include indirectly applying a force to the preload member through any suitable mechanical advantage device, for example lever arm 224 such as shown in FIG. 2, a cam, or the like.

Actively adjusting can include controlling the actuator operatively connected to the preload member (whether directly or indirectly) to move the preload member, adjusting a force (e.g., F) applied to the biasing member by the preload member, thereby changing a state of the valve (e.g., by moving valve body 102). Actively adjusting can include adjusting the force applied to the biasing member by the preload member to change an operating set point of the valve.

In embodiments, controlling the actuator to change the operating set point of the valve can include controlling the actuator based at least in part on feedback from a sensor 128 in a fluid line 130 in which the valve 117 is disposed or a sensor 128 disposed on or within the valve 117. In embodiments, the feedback can include at least one of: total flow feedback, pressure feedback, temperature feedback of the fluid in the fluid line, and/or feedback relating to a position of one or more additional valves.

Embodiments can utilize an actuated spring preload adjustment, e.g., for a valve. Piezoelectric devices can offer high force, high precision, and fast response time capability when used as an actuator. In certain applications, the piezoelectric actuator can be used to bias one end of a valve spring, where such a movement could change the preload on the spring and influence the operating point of the valve. In embodiments, mechanical advantage devices such as a lever arm could also be used to increase the displacement amount from the actuator to the spring bias.

Embodiments allow for active calibration or trimming, where active is defined as during operation. In embodiments, multiple set points for operation could be used. Embodiments can be used in a number of applications. For example, embodiments can be used for pressure regulating valves to improve accuracy; for flow divider valves having adjustable division properties; for minimum pressure valves having adjustable minimum pressure points; and/or for fuel nozzle valves to improve calibration control or active tone mitigation, among others. Embodiments can improve dynamic performance of valves through spring preload manipulation. In certain embodiments, on the fly adjustment allows for compensation for changes to load or fluid temperature, improving accuracy and performance of the system, while also minimizing system disturbance.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system comprising:
    a moveable component configured to move between one or more positions;
    a biasing member operatively connected on a first side to bias the moveable component to a respective one of the one or more positions;
    a preload member operatively connected to provide a force to a second side of the biasing member;

an actuator operatively connected to move the preload member in response to a signal from a controller to adjust the force applied to the second side of the biasing member and to adjust displacement of the moveable component, wherein the moveable component includes a valve body disposed in a valve chamber and wherein the biasing member and preload member are disposed in the valve chamber to form a flow valve, and further comprising a fluid line fluidly connecting a fluid source to a fluid destination, the flow valve disposed in the fluid line between the fluid source and the fluid destination, wherein the controller is configured to control the actuator to adjust the preload member while the fluid is supplied to the flow valve in the fluid line, wherein the fluid source is a fuel tank and the fluid destination is one or more fuel nozzles, wherein the fluid line is a fuel line fluidly connecting the fuel tank to the one or more fuel nozzles, further comprising a fuel pump configured to pump fuel from the fuel tank to the one or more fuel nozzles, wherein the flow valve is one of a pressure regulating valve, a flow divider valve, or a fuel nozzle valve and wherein the controller is configured to actively control the actuator to adjust the preload member of the valve in the fuel line to compensate for load changes in the fuel line.

2. The system as recited in claim 1, further comprising the controller operatively connected to control the actuator.

3. The system as recited in claim 2, wherein the valve body is configured to move between an open position and a closed position within the valve chamber to change a state of a valve.

4. The system as recited in claim 3, wherein the biasing member is disposed in the valve chamber and is configured to bias the valve body towards a first position.

5. The system as recited in claim 4, wherein the actuator is configured to adjust the force applied to the biasing member to change an operating set point of the valve.

6. The system as recited in claim 5, wherein the fluid source is configured to supply fluid to the valve.

7. The system as recited in claim 1, wherein the actuator includes a piezoelectric actuator.

8. The system as recited in claim 1, further comprising a lever arm operatively connected between the preload member and the actuator, wherein the actuator is configured to move the preload member via the lever arm in response to a signal from a controller to adjust the force applied to the biasing member and change displacement of the moveable component.

9. The system as recited in claim 8, wherein a fulcrum of the lever arm is positioned such that displacement of the preload member by the lever arm is larger than displacement of the lever arm by the actuator.

10. The system as recited in claim 1 wherein the pump is upstream of the flow valve, and wherein the controller is configured to control the actuator to adjust the preload member without shutting down the pump.

11. A method, comprising:
actively adjusting a preload member of a valve using an actuator operatively connected to move the preload member while fluid is supplied to the valve; and
supplying fluid to the valve via a pump, wherein actively adjusting includes moving the actuator to adjust the preload member of the valve without shutting down the pump, wherein the valve is disposed in a fluid line fluidly connecting a fluid source to a fluid destination therebetween, wherein adjusting the preload member is performed while the fluid is supplied to the valve in the fluid line, wherein the fluid source is a fuel tank and the fluid destination is one or more fuel nozzles, wherein the fluid line is a fuel line fluidly connecting the fuel tank to the one or more fuel nozzles, wherein the pump is configured to pump fuel from the fuel tank to the one or more fuel nozzles, wherein the valve is one of a pressure regulating valve, a flow divider valve, or a fuel nozzle valve and wherein the controller is configured to actively control the actuator to adjust the preload member of the valve in the fuel line to compensate for load changes in the fuel line.

12. The method as recited in claim 11, wherein actively adjusting includes directly applying a force to the preload member.

13. The method as recited in claim 11, wherein actively adjusting includes indirectly applying a force to the preload member through a mechanical advantage device.

14. The method as recited in claim 11, wherein actively adjusting includes controlling an actuator operatively connected to move the preload member to adjust a force applied to a biasing member by the preload member to change a state of the valve.

15. The method as recited in claim 14, wherein the actuator includes a piezoelectric actuator.

16. The method as recited in claim 14, wherein actively adjusting includes adjusting the force applied to the biasing member by the preload member to change an operating set point of the valve.

17. The method as recited in claim 16, wherein controlling the actuator to change the operating set point of the valve includes controlling the actuator based at least in part on feedback from a sensor in a fluid line in which the valve is disposed.

18. The method as recited in claim 17, wherein the feedback includes at least one of: total flow, pressure, temperature, and/or a position of one or more additional valves.

* * * * *